United States Patent [19]
Houk

[11] 3,786,689
[45] Jan. 22, 1974

[54] SINGLE LEVER JOY-STICK APPARATUS
[75] Inventor: Richard D. Houk, Stow, Ohio
[73] Assignee: Rockwell International Corporation, Pittsburgh, Pa.
[22] Filed: Aug. 8, 1972
[21] Appl. No.: 278,789

[52] U.S. Cl. .......................................... 74/471 XY
[51] Int. Cl. .......................................... G05g 9/02
[58] Field of Search ...................... 74/471 XY, 471

[56] References Cited
UNITED STATES PATENTS
| 3,021,721 | 2/1962 | Hooven | 308/DIG. 7 |
| 3,094,376 | 6/1963 | Thomas | 308/DIG. 7 |
| 3,296,882 | 1/1967 | Durand | 74/471 XY |
| 3,541,877 | 11/1970 | Houk | 74/471 XY |

*Primary Examiner*—Allan D. Herrmann

[57] ABSTRACT

A single lever joy-stick apparatus comprising a housing, first and second slotted motion transmitting members pivotally mounted in said housing such that their respective pivot axes perpendicularly intersect, a joy-stick having a spherical ball attached to its shaft, portions of said shaft of said joy-stick engaging said motion transmitting members at bearing surfaces defined by said slots, each of said motion transmitting members having oppositely disposed substantially concave bearing surfaces intermediate their respective ends, mating with the convex outer surface of said spherical ball for supporting said ball in its operational position.

9 Claims, 4 Drawing Figures

SINGLE LEVER JOY-STICK APPARATUS

BACKGROUND OF THE INVENTION

The present invention relates to single lever control apparatuses. In particular, the present invention relates to a single lever joy-stick apparatus whereby the movement of a single lever can selectively control multiple actions or movements.

Specifically, the present invention relates to a single lever joy-stick apparatus whereby the movement of a single lever can selectively control two remote servient mechanisms either singularly or in an infinite multiplicity of combinations involving varying degrees of control or sequential control.

The prior art is replete with control apparatus providing controls for dual servient mechanisms by the operation of a single lever. These prior art mechanisms can be generally characterized as inefficient, complex, expensive and highly susceptible to premature failure. The Beurrier single lever control apparatus as disclosed in U.S. Pat. No. 3,394,611 is a typical example of such a mechanism.

The above noted devices have rendered the prior art mechanisms totally unsuitable for harsh environments such as found on heavy construction sites. Accordingly, the operator of current earth moving equipment is required to use two or more levers to control the horizontal and/or vertical disposition of the crane, backhoe, power shovel and the like.

SUMMARY OF THE INVENTION

It is a principle object of the present invention to provide an improved single control apparatus for multiple actions.

Another principle object of the present invention is to provide an improved single lever joy-stick apparatus comprising a housing, first and second slotted motion transmitting members pivotally mounted in the housing such that their respective pivot axes perpendicularly intersect, a joy-stick having a spherical ball attached to its shaft, portions of said shaft of the joy-stick engaging the motion transmitting members at bearing surfaces defined by the slots, each of the motion transmitting members having oppositely disposed substantially concave bearing surfaces intermediate their respective ends, mating with the convex outer surface of the spherical ball for supporting the ball in its operational position.

Another object of the present invention is to provide an improved single lever control apparatus in which selective movement of the control lever effects efficient individual control of the servient mechanisms.

A further object of the present invention is to provide a single lever control apparatus which is simpler, efficient, inexpensive and highly adaptable to harsh environments.

It is a still further object of the present invention to provide an improved single lever control apparatus which is substantially universal in application without causing binding or frictional resistance.

These and other objects of the present invention, as well as the advantages thereof over the prior art, will be apparent in view of the following description and the attached drawings. A preferred embodiment is shown by way of example in the accompanying drawings and described in detail herein. Various modifications and changes in details of construction are comprehended within the scope of the present invention as defined by the appended claims.

DETAILED DESCRIPTION OF THE DRAWINGS

Figure 1:
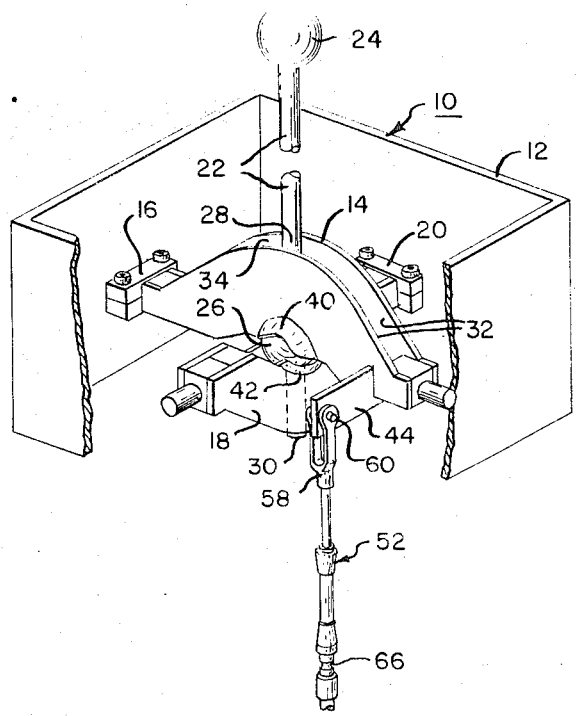
FIG. 1 is a perspective view of preferred embodiment of the present invention showing the control lever essentially in its neutral position.
Figure 4:
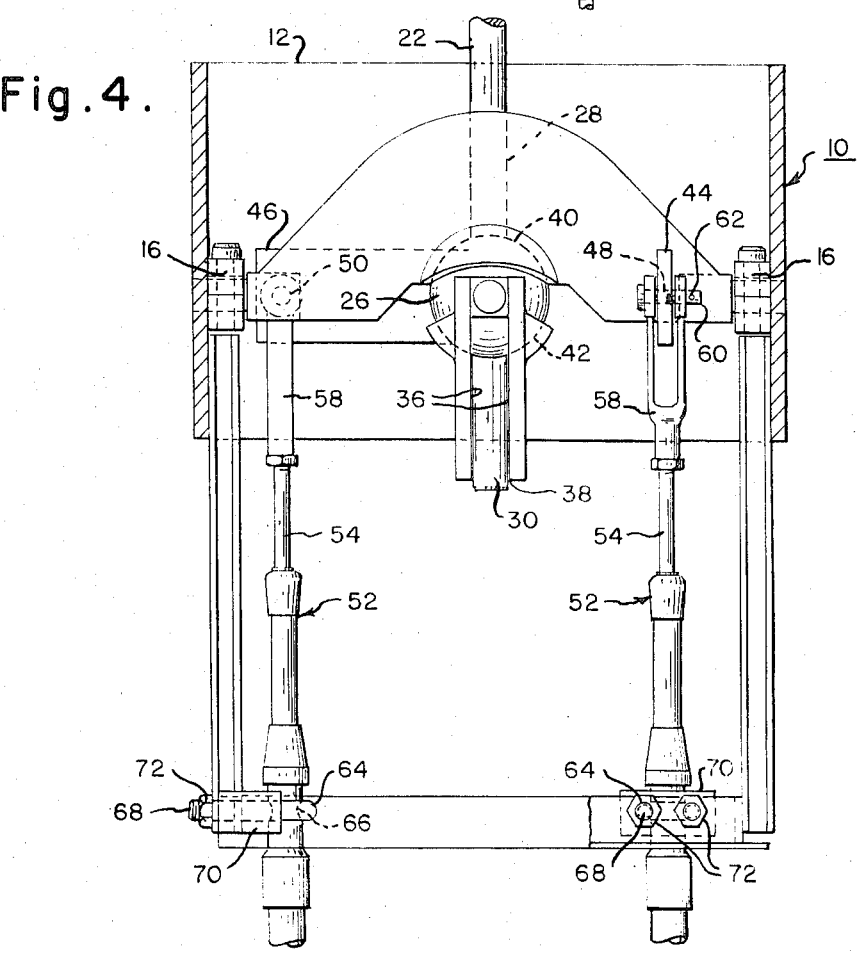
FIG. 4 is a view taken in vertical section on line 4—4 of FIG. 2.
Figure 2:
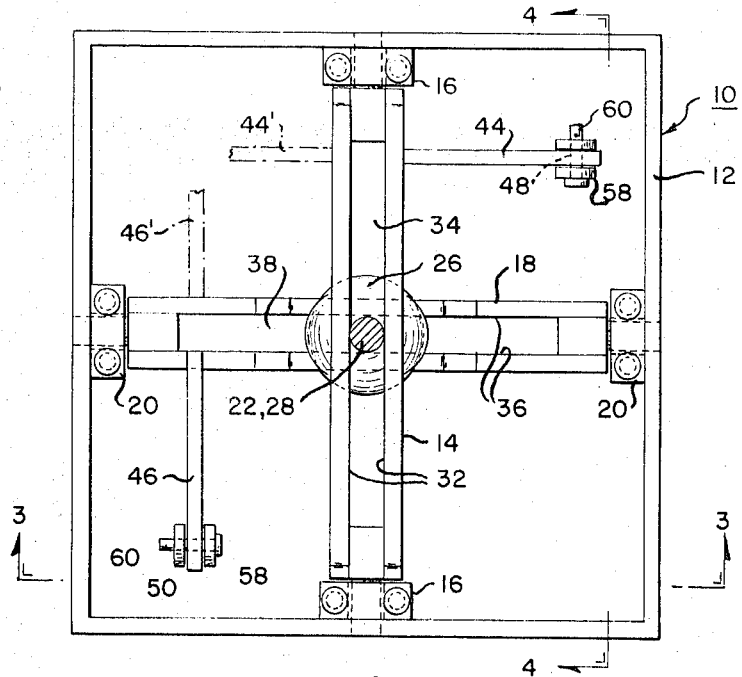
FIG. 2 is a top plan view of the single lever joy-stick apparatus of FIG. 1.
Figure 3:
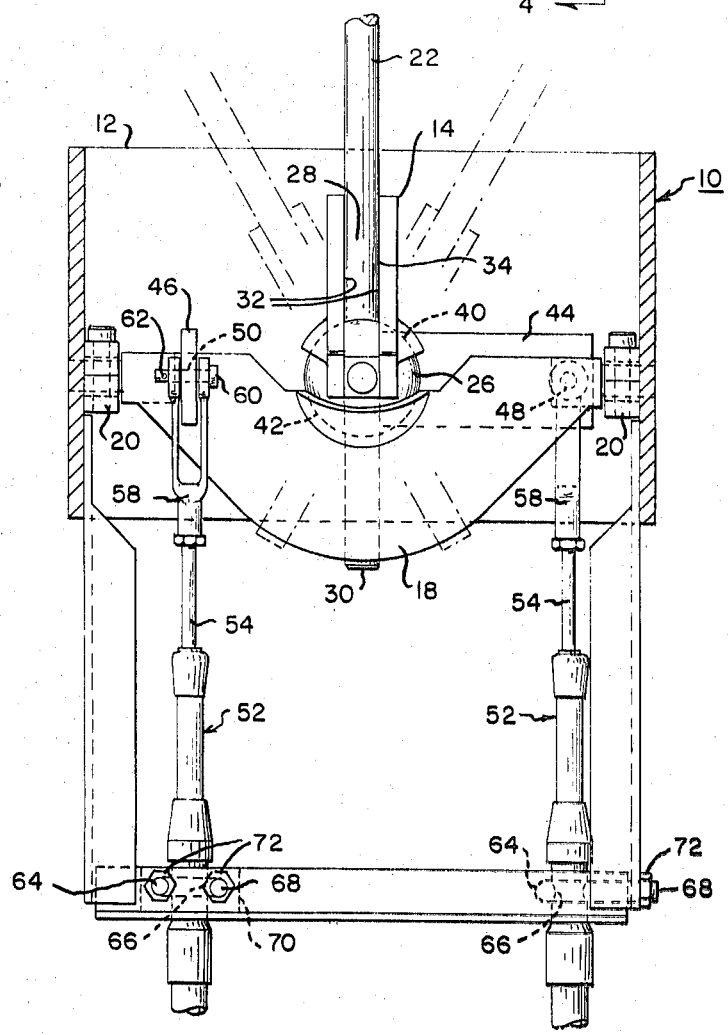
FIG. 3 is a bottom plan view of the single lever joy-stick apparatus of FIG. 1.

Referring now to the drawings, a single lever joy-stick apparatus in accordance with the present invention is designated generally by the numeral 10. The joy-stick apparatus 10 includes a frame 12 which could be square or rectangular in form. The frame 12 is adapted to be fixedly mounted in operative position by means not shown. The joy-stick apparatus is further provided with a first slotted motion transmitting member 14 pivotally mounted in said housing 12 by means such as bearings 16. A second slotted motion transmitting member 18 is likewise pivotally mounted in said housing 12 by means such as bearings 20. The first motion transmitting member 14 and the second motion transmitting member 18 are so pivotally mounted in said housing whereby their respective pivot axes perpendicularly intersect. The point of intersection will be as later described.

The joy-stick apparatus 10 is further provided with a joy-stick 22 having a control knob 24. The joy-stick apparatus 22 is further provided with a spherical ball 26 which is fixedly attached or integral with the joy-stick 22. The spherical ball 26 is disposed on said joy-stick 22 at a distance from the end of the joy-stick 22 thereby dividing it into an upper portion 28 and a lower portion 30. At least a part of the upper portion 28 of the joy-stick 22 engages the first motion transmitting member 14 at bearing surface 32 defined by a slot 34 in said first motion transmitting member 14, said slot 34 being parallel to the pivotal axis of the first motion transmitting member 14. The slots 34 run completely through the first motion transmitting member 14. Likewise, at least a part of the lower portion 30 of the joy-stick 22 engages the second motion transmitting member 18 at bearing surface 36 defined by a slot 38 in said second motion transmitting member 18, said slot 38 being parallel to the pivotal axis of the said second motion transmitting member 18. The slots 38 run completely through the second motion transmitting member 18.

The point of intersection of the respective axes of the first and second motion transmitting members 14 and 18 corresponds to the center of the spherical ball 26.

The first motion transmitting member 14 is further provided with a substantially first concave bearing surface 40 intermediate its ends. Similarly, the second motion transmitting member 18 is provided with a second substantially concave surface 42 oppositely disposed from said first bearing surface 40 and said second bearing surface being disposed on said second motion transmitting member 18 intermediate its ends.

The first and second concave bearing surfaces 40 and 42 mate with the convex outer surface of said spherical ball 26 to support the ball and in turn said joy-stick 22 in their operational position.

The first and second motion transmitting members 14 and 18 are further provided with at least one output extension 44 and 46 respectively. The first and second motion transmitting members could, of course, have fitted, on either of their sides, additional output extensions as, for example, the output extensions 44' and 46' (in phantom). The output extensions 44 and 46 are each fixedly attached to the motion transmitting members 14 and 16. The output extensions may also be provided with an aperture 48 and 50 at their other end. The output extensions 44 and 46 are adapted to be operably connected to a push-pull cable assembly 52. The push-pull cable assembly 52 is well-known in the prior art and is provided with an axially movable core 54 movable within a conduit 56. The core 54 may be suitably attached with a yoke 58 for rotatable attachment to the first and second motion transmitting members with the output extensions 44 and 46 by means such as a pin 60. The pin 60 may be held in its operational position by suitable fastening means such as a clip 62. The core 54 of the push-pull cable assembly 52 may be anchored or attached to the housing 12 by a suitable means such as a U bolt assembly 64. It can be seen that the push-pull cable assembly 52 may be provided with a groove 66 and the U bolt assembly 64 may mechanically grasp and hold the push-pull cable assembly 52 in place at the groove 66. The U bolt assembly 64 may include a threaded U bolt 68, a support block 70 and two nuts 72. The U bolt assembly 64 may be attached directly to the housing 12 or may be attached to a suitable bracket (not shown) which in turn could be attached to housing 12.

Accordingly, there is above provided a single lever joy-stick apparatus which is capable of affecting a gimbal-like action of its motion transmitting members 14 and 18.

As mentioned before, the point of intersection of the respective axes of the first and second motion transmitting members 14 and 18 corresponds to the center of the spherical ball 26. The joy-stick 22 therefore can be moved in any direction about the center of the spherical ball 26 thereby effecting an infinite number of combinations of movements or control of a number of remote servient mechanisms through the axial displacement of the core 54.

The movement of the first motion transmitting member 14 can be totally segregated from the motion of the second motion transmitting member 18 when the joy-stick is moved about the center of the ball 26 in a direction in line with the slot 38 of the second motion transmitting member 18.

In this particular mode, the first motion transmitting member 14 will pivot on its bearings 16 and the fixedly attached output extension 44 will move in an arc with the first motion transmitting member 14. This in turn will drive the core 54 of the push-pull cable assembly 52 which is operably attached to the output extension 44. The direction of movement of the core 54 will depend upon the direction of movement of the joy-stick 22 with respect to its neutral or null position, that is, when the longitudinal axis of the joy-stick 22 is substantially perpendicular to the pivotal axes of the first motion transmitting member 14 and the second motion transmitting member 18.

Conversely, the movement of the second motion transmitting member 18 can be totally segregated from the motion of the first motion transmitting member 14 when the joy-stick is moved about the center of the ball 26 in a direction in line with the slot 34 of the first motion transmitting member 14. In this latter mode, the second motion transmitting member 18 will pivot on its bearings 20 and the fixedly attached output extension 46 will move in an arc with the second motion transmitting member 18. This in turn will drive the core 54 of the push-pull cable assembly 52 which is operably attached to the output member 46. The direction of movement of the core 54 will depend upon the direction of movement of the joy-stick 22 with respect to the neutral position.

As each of the output extensions 44 and 46 move with their respective motion transmitting members 14 and 18, it can be seen that their angular position with respect to the push-pull cable assembly 52 will vary. This variation in angular position is accommodated by a swivel or ball joint (not shown) in the push-pull cable assembly 52 located above the U bolt assembly 64. The push-pull cable assembly 52 will tend to oscillate at the swivel joint as the output extensions 44 and 46 move through their respective arcs. This oscillating action of the push-pull cable assembly 52 will accommodate the angular variations and will enable the core 54 to move smoothly within the conduit 56.

Similarly, the movement of the first motion transmitting member 14 and the second motion transmitting member 18 can be integrated in an infinite number of combinations of controlled movements of the cores 54 which are operably attached to the first and second output extensions 44 and 46. Both core members 54 will move in a coordinated fashion when the joy-stick is moved diagonally, that is, in a direction out of line with the slots 34 and 38 of the first and second motion transmitting members 14 and 18 respectively. A template or other control plate (not shown) could be placed on the top of the housing 12 to guide the control of the joy-stick in a particular fashion or pattern. Such a template might be used in the case where the joy-stick apparatus would be utilized to control a multi-speed transmission. Such a template or other control plate would not be necessary in the case where the single lever joy-stick apparatus is used to control a crane, backhoe or other similar type equipment. In this type of situation, the operator would encounter an infinite number of control requirements.

The various components and parts of the single lever joy-stick apparatus in accordance with the present invention could be manufactured from a wide range of materials. Additionally, the various bearing surfaces of the joy-stick apparatus 10 could be suitably treated and/or coated with a self-lubricating plastic material such as polytetrafluoroethylene. In particular, the convex surface of the ball 26, the concave bearing surfaces 40 and 42, the bearing surfaces 32 and 34 of the first and second motion transmitting members 14 and 18, as well as the bearing surfaces 32 and 34 of the first and second motion transmitting members 14 and 18 could all be coated with a suitable self-lubricating plastic. The joy-stick 22 and the first and second motion transmitting members could be made of suitably hardened steel heat treated and otherwise coated depending upon application and environment.

It can be seen from the above that the single lever joy-stick apparatus including the centrally disposed spherical ball 26 results in an inherently stable mechanism which can be sturdily constructed to operate without binding of the motion transmitting members and their respective operatively connected push-pull cable cores.

The stability of such a control apparatus permits its ready adaption as a unified control, as for example, is required for the operation of dual hydraulic winches; for selective remote control of the dual functional movements of such heavy equipment as cranes, hoists and tracked vehicles; or, for such cooperative control as is required in the coordination of the engine and steering of boats.

It must be noted that while a preferred embodiment of the single lever joy-stick apparatus was shown to cause axial translation of push-pull cable cores to in turn control servient mechanisms, this particular adaption was chosen because it permitted full presentation of flexibility of the apparatus with visual clarity. It should be therefore apparent that the above depicted single lever joy-stick apparatus could be adapted to interengage with other suitable linkage arrangements known to the art.

I claim:

1. A single lever joy-stick apparatus comprising a housing, first and second slotted motion transmitting members pivotally mounted in said housing such that their respective pivot axes perpendicularly intersect, a joy-stick having a spherical ball having a smooth, uninterrupted convex outer surface attached to its shaft, portions of said shaft of said joy-stick engaging said motion transmitting members at bearing surfaces defined by said slots, each of said motion transmitting members having oppositely disposed substantially concave bearing surfaces intermediate their respective ends, mating with the convex outer surface of said spherical ball for supporting said ball in its operational position, the center of said spherical ball corresponds to the point at which the respective pivot axes of said first and second motion transmitting members intersect.

2. A single lever joy-stick apparatus according to claim 1 wherein each of said motion transmitting members are provided with at least one output extension for driving the cores of a push-pull cable.

3. A single lever joy-stick apparatus according to claim 2 wherein said core is disposed for axial movement within a conduit, said conduit being rockably attached to said housing by holding means.

4. A single lever joy-stick apparatus according to claim 3 wherein there are two push-pull cables the core of each respectively attached to the first and second motion transmitting members.

5. A single lever joy-stick apparatus according to claim 4 wherein said conduit has a grooved end fitting attached thereto and said holding means further includes a substantially U shaped member engaging said end fitting at said groove.

6. A single lever joy-stick apparatus according to claim 1 wherein said ball is attached to said shaft at a distance from its end, the upper portion of said shaft engaging said first motion transmitting member and said lower portion of said shaft engaging said second motion transmitting member at each of their respective bearing surfaces as defined by said slots.

7. A single lever joy-stick apparatus according to claim 2 wherein said output extensions include a bar fixedly attached at one of its ends to each of said motion transmitting members and said bars being provided with an aperture at the opposite ends thereof, said cores being provided with attaching means for attaching said cores to said bars at said apertures.

8. A single lever joy-stick apparatus according to claim 7 wherein said attaching means includes a yoke fixedly attached to end of said core, said yoke having aligned apertures therein, holding pin means disposed at said apertures and engaging said bars at said bar apertures.

9. A single lever joy-stick apparatus according to claim 1 wherein first and second slotted motion transmitting members are pivotally mounted in bearings in said housing and said joy-stick is further provided with a knob.

* * * * *